Nov. 23, 1926.  1,607,984

J. T. JENKINS

MOTION PICTURE CAMERA

Filed Sept. 29, 1924  5 Sheets-Sheet 1

Inventor
John T. Jenkins

Attorney

Nov. 23, 1926. 1,607,984

J. T. JENKINS

MOTION PICTURE CAMERA

Filed Sept. 29, 1924   5 Sheets-Sheet 2

Inventor
John T. Jenkins
Attorney

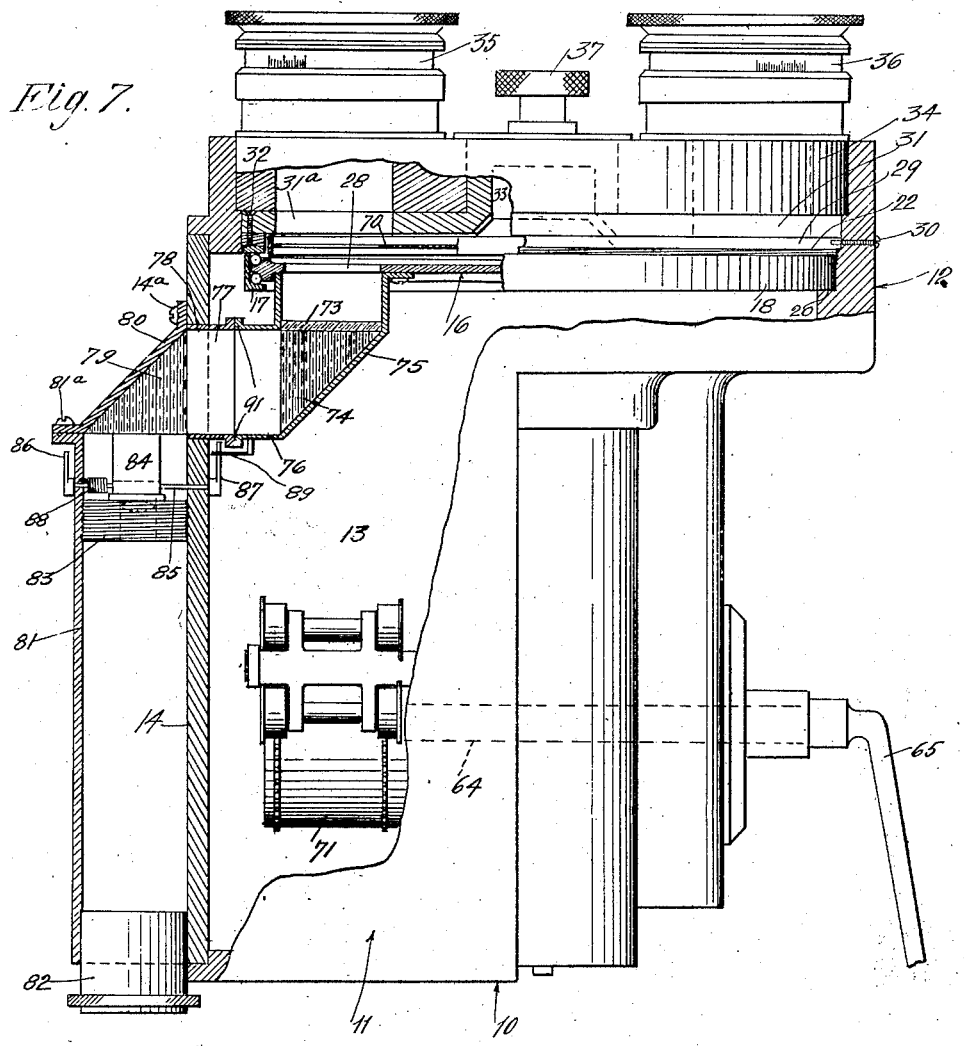
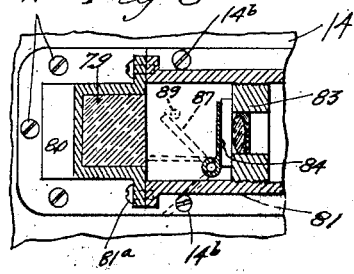

Nov. 23, 1926.                                              1,607,984
J. T. JENKINS
MOTION PICTURE CAMERA
Filed Sept. 29, 1924          5 Sheets-Sheet 4
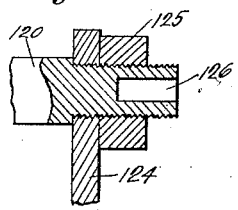
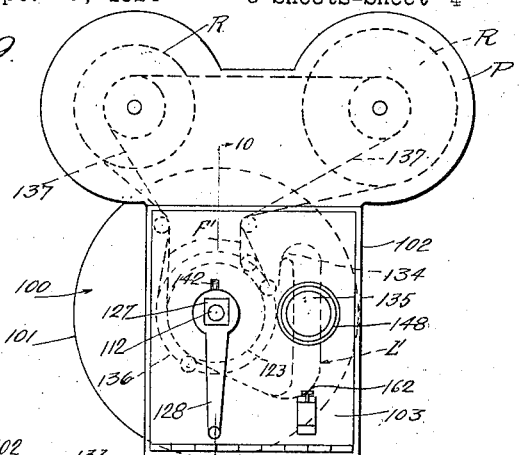
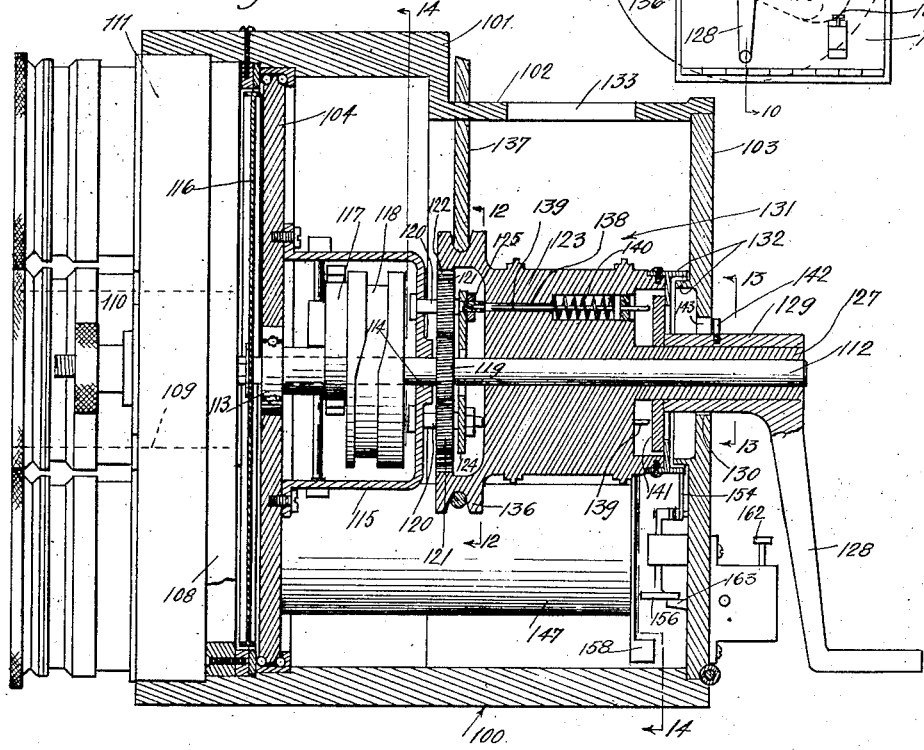
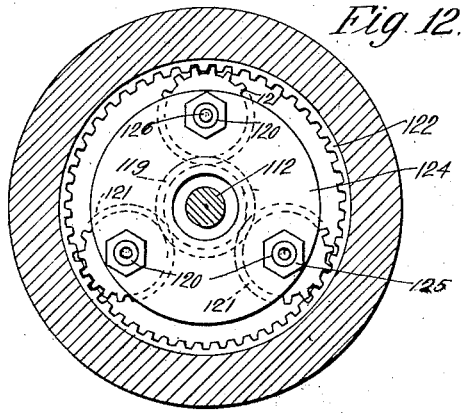
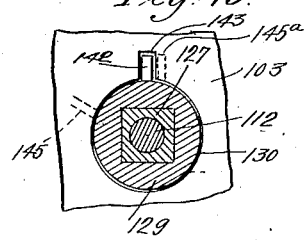
Inventor
John T. Jenkins
Attorney Nov. 23, 1926.
J. T. JENKINS
1,607,984
MOTION PICTURE CAMERA
Filed Sept. 29, 1924    5 Sheets-Sheet 5
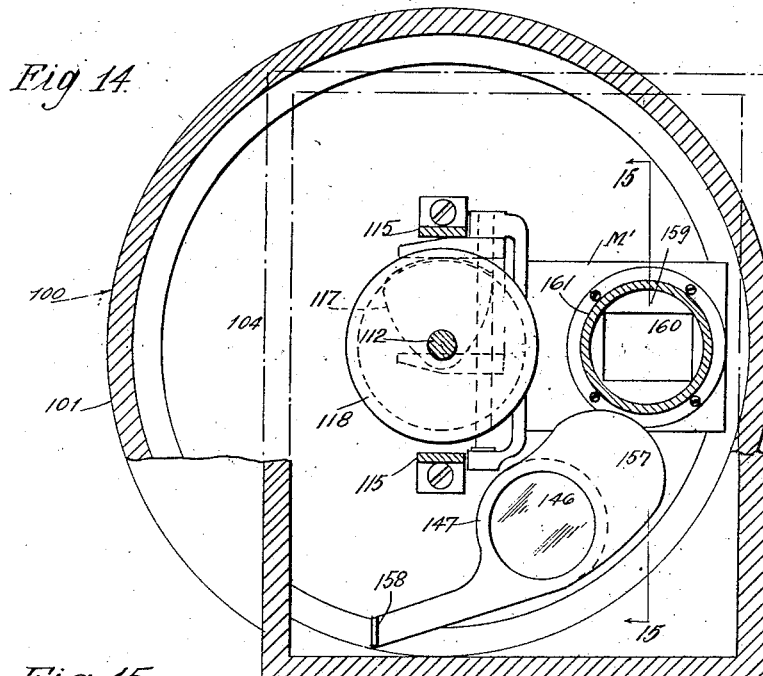
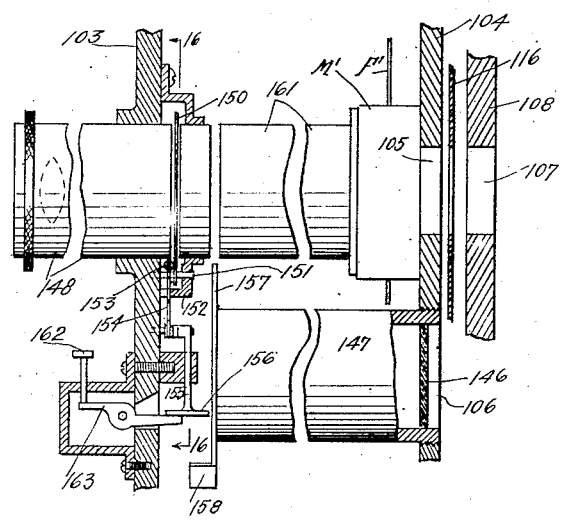
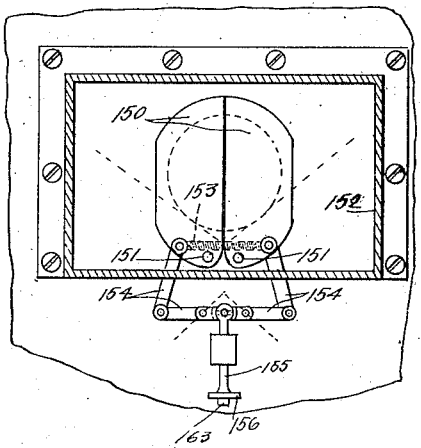
Inventor
John T. Jenkins
Attorney.

Patented Nov. 23, 1926.

1,607,984

UNITED STATES PATENT OFFICE.

JOHN T. JENKINS, OF LOS ANGELES, CALIFORNIA, ASSIGNOR TO MITCHELL CAMERA CORPORATION, OF LOS ANGELES, CALIFORNIA, A CORPORATION OF CALIFORNIA.

MOTION-PICTURE CAMERA.

Application filed September 29, 1924. Serial No. 740,427.

This invention has to do with focusing and view finding devices for motion picture cameras, and it may be stated as a general object of the invention to provide a device whereby accurate focusing is facilitated.

To clearly bring out the novel features and advantages of the invention, it will be helpful to discuss briefly several of the focusing methods now commonly practiced. Certain makes of cameras are focused through the film, while in other cameras, focusing is accomplished by temporarily removing the film and inserting a ground glass in the photographing or exposure aperture, either method consuming considerable time and necessitating the wastage of several feet of film at each focusing.

Then there are other cameras which must be shifted from one side of the tripod to the other during focusing operation, and since my invention may be applied with special advantage to this type of camera (though I eliminate the necessity of shifting the camera during focusing) I will outline the general construction of a camera of this type and the steps followed during focusing. Such a camera has a lens turret adapted to be revolved about a central spindle for bringing a given lens into registration with the exposure aperture of the camera or the diametrically opposed focusing aperture, the latter having a ground glass which is in constant register with an eye piece located exteriorly of the film chamber.

There are two ways (other than by setting the lens mounts from measurement) of focusing such cameras. First, assuming that the lens is in line with the objects to be photographed, the turret is revolved to bring the lens into register with the focusing aperture. The camera may now be focused by manipulation of the lens mount, but since the focusing aperture is horizontally spaced several inches from the exposure aperture, the true boundaries of the field to be photographed will not appear on the ground glass of the focusing aperture, obviously preventing accurate focusing and lining up of the field. To rectify this condition, such cameras are slidable upon their tripods, so after the turret has been rotated to bring the lens into register with the focusing aperture, the camera may be shifted horizontally to carry the lens into the same linear position with relation to the object to be photographed as it occupied when before the exposure aperture. After the focusing is completed, the camera must be shifted back to its original position, and the lens turret revolved to return the lens to a position of register with the exposure aperture. These several operations, followed each time the camera is focused, necessarily consume considerable valuable time in the aggregate.

I avoid the objectionable features above mentioned by providing the camera with a revoluble member, this member being provided with a focusing aperture and an exposing aperture, part or all of the film advancing mechanism being mounted on the member. Then, when it is desired to focus the camera, it is only necessary to revolve the member to bring the focusing aperture into register with the lens (the intermittent movement and film loop supported thereby being simultaneously moved from its operative position of register with the lens) and the camera may be accurately focused by viewing the ground glass through a suitably arranged eye piece. Thus, I am able to accomplish accurate focusing without moving either the camera or the lens turret; nor need I focus through the film nor remove the film and insert a ground glass in the exposure aperture.

As another feature of the invention I have provided means whereby the revoluble member is automatically rotated to bring the exposure aperture into registration with the lens after focusing is accomplished, said means being operatively connected to the usual hand crank of the camera.

Provision is made to prevent fogging of the film within the film chamber of the camera during movement of the revoluble member and while the focusing aperture is in operative position.

In certain types of cameras, the arrangement of the feed and take-up sprockets is such as to preclude the positioning of the focusing eye piece directly behind the lens. In such a situation, I provide a mirror or prism system (one total reflection prism being mounted on the revoluble member and in register with the focusing aperture, and another total reflection prism being mounted on the camera frame or an associated part) whereby light entering the focusing aperture is projected around the sprockets so a reflection of the image formed on the ground glass may be viewed from points lying without the projected optical axis of the lens. Or the prism system may be such that the light is projected around the sprocket-mechanism and to an eye piece lying directly behind said mechanism and in line with the projected optical axis of the lens.

Further objects and novel features of the invention will be set forth in the following detailed description, reference being made to the accompanying drawings, in which:

Fig. 7 is a view similar to Fig. 5 but showing certain parts as having been moved to bring the focusing aperture into operative position;

Fig. 8 is a section on line 8—8 of Fig. 6;

Fig. 9 is a rear elevation of a different type of camera equipped with my device;

Figure 1:
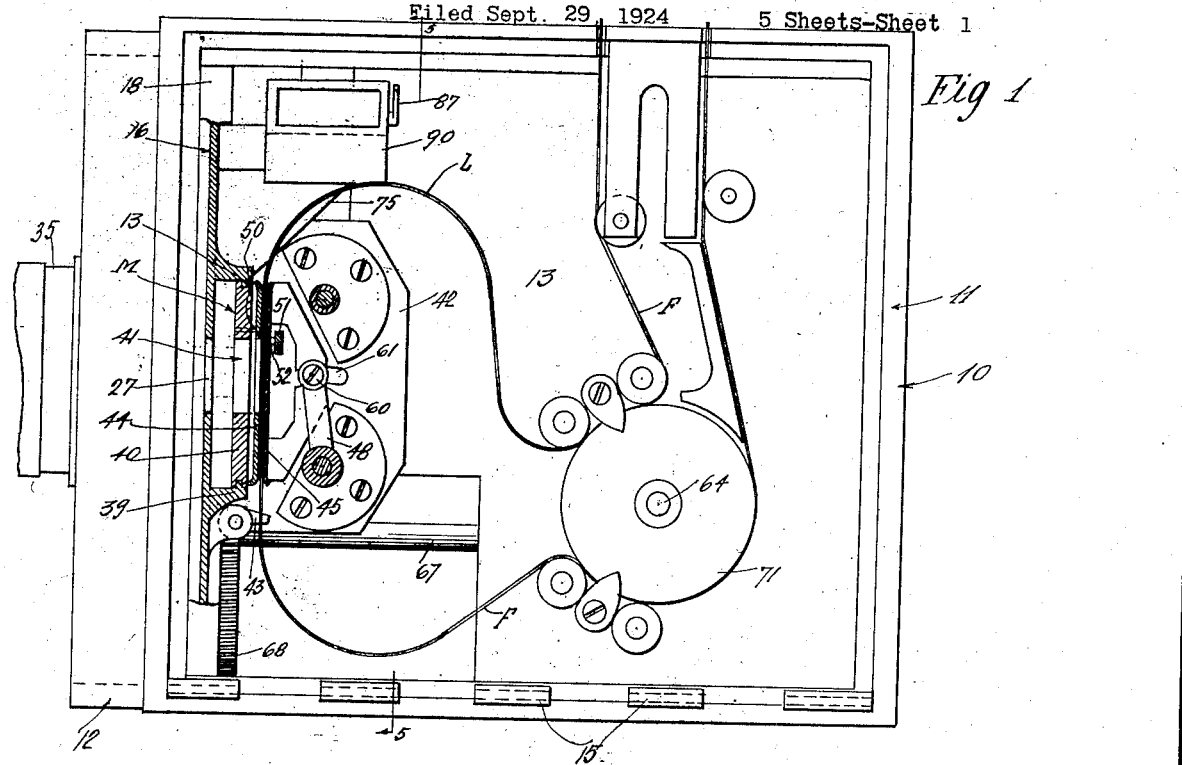
Fig. 1 is a side elevation, partly in section showing a camera equipped with my improvements, the side door of the camera being removed and the parts shown in section being viewed from line 1—1 of Fig. 5.
Figure 2:
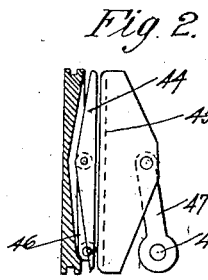
Fig. 2 is a fragmentary section on line 2—2 of Fig. 5.
Figure 3:
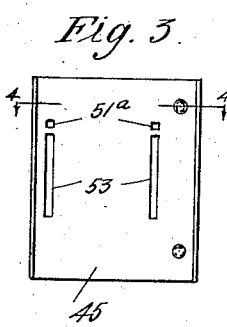
Fig. 3 is a side elevation of Fig. 2 but with the crank arms removed.
Figure 4:
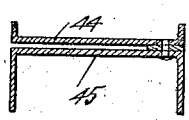
Fig. 4 is a fragmentary section on line 4—4 of Fig. 3.

Fig. 10 in an enlarged section on line 10—10 of Fig. 9, the film magazine being removed;

Fig. 11 is an enlarged fragmentary detail of an interlocking element shown in Fig. 10;

Fig. 12 is a section on line 12—12 of Fig. 10;

Fig. 13 is a fragmentary section on line 13—13 of Fig. 10;

Fig. 14 is a section on line 14—14 of Fig. 10;

Fig. 15 is a fragmentary section on line 15—15 of Fig. 14; and

Fig. 16 is a section on line 16—16 of Fig. 15.

First referring to Figs. 1 to 8 inclusive, I will describe the construction of a camera box and film moving mechanism with some particularity, though certain parts illustrated are not new with me, this description being made for the purpose of clearly pointing out the adaptation of my invention to a typical camera mechanism. However, it is not to be inferred that the invention, in its broader aspects, is limited in its application to a camera mechanism of this particular type.

Camera frame 10 includes a substantially rectangular housing 11 which opens at its forward end into cylindrical housing 12, access being had to film chamber 13 by swinging door 14 upon its hinges 15.

Within cylindrical housing 12 is a rotatable carrier member or plate 16 (which may be substituted for the face plate of a usual camera) and the mounting of this member so it may be shifted or rotated is an important feature of my invention.

The precise method of rotatably mounting member 16 is susceptible of many variations, all lying within the scope of my broader claims. For instance, the member may be mounted for rotation upon a central shaft, and may be held against displacement in the direction of the shaft axis in any suitable manner. However, I prefer to provide the bearing for the member between its peripheral face and the surrounding casing 12. Member 16 is shown in the form of a disc having ball races 17 provided about its periphery. A race ring 18 is thrust through the bore of housing 12 into the position shown in Fig. 6, peripheral flange 19 engaging annular shoulder 20 of said housing.

After balls 21 and member 16 have been positioned as illustrated, a race and retention ring 22 is threaded into the bore of housing 12 and serves to retain the bearing in assembly and to hold member 16 against displacement longitudinally of the camera. Any wear developing in the bearing may be taken up by screwing home ring 22. Member 16 is adapted to be rotated by handle 23 which extends through slot 24 in housing 12, shoulders 25 and 26 limiting the angular movement in opposite directions. When handle 23 contacts with shoulder 25, exposure aperture 27 in member 16 (Fig. 6) is in operative position, (as will be hereinafter explained) while counterclockwise rotation of member 16 (as viewed in Fig. 5) until handle 23 engages shoulder 26, brings focusing aperture 28 (Fig. 7) into operative position the two apertures preferably (though not necessarily) being about 60° apart and being equally spaced from the center of rotation.

Immediately in front of ring 22 is a second ring 29 removably held in position by screws 30, and turret plate 31 (having photographic aperture 31ª) is removably anchored to ring 29 by screws 32. The lens aperture may also be considered a photographic aperture. Plate 31 is in the form of a disc having a central hub 33 upon which is rotatably mounted the lens turret 34, it following that the axes of rotation of member 16 and of turret 34 are substantially coincident, said turret carrying a plurality of lens mounts 35, 36 which contain the usual adjustable lens systems, each of the several systems having individual focal characteristics. A clamping nut 37 coacts with turret plate screw 38 in a manner to hold turret 34 with a chosen lens mount in alignment with aperture 31ª.

The intermittent movement or mechanism for moving the film past exposure aperture 27 when the latter is in register with turret plate aperture 31ª (and hence with the aperture of lens mount 35) is mounted on plate 16, so when said plate is revolved to bring focusing aperture 28 into register with aperture 31ª, the intermittent movement (and the film loop supported thereby) is carried from behind aperture 31ª to make room for the focusing element, to be described.

While the intermittent mechanism may be of any suitable type and actuated by any suitable drive connective means from the main crank shaft, I have illustrated and will describe a typical mechanism in some detail, making it apparent how such a mechanism may be shifted to and from operative position without disconnecting any of the drive connective elements. Preferably, though not necessarily, the intermittent mechanism, which I generally indicate at M, is bodily removable from member 16 so it may be more readily inspected and cleaned.

Tongued slideways 39 (Fig. 1) are adapted to receive body plate 40 of movement M, said plate having an exposure aperture 41 adapted to register with aperture 27, and having angle plates 42 and 42ª. The slideways are set back from plate 16 a sufficient distance to clear ring 18 and allow member 40 to be slid into or out of operative position when door 14 is open. Button 43 on plate 16 provides releasable means for holding movement M in operative position. Immediately behind body member 40 is an apertured stripper plate 44 which is attached to but slightly spaced from pressure plate 45 (see Figs. 1 to 4). Plate 44 is supported on member 40 by links 46, while plate 45 is pivotally supported by links 47, 48 which are pivotally mounted on cross shaft 49, the latter extending between angle plates 42, 42ª. Pilot pins 50 project from the face of member 40, there being registering apertures 51ª in plates 44 and 45. Extending across the back of plate 45 is a shuttle bar 51 having catch pins 52 which are adapted to project, at times, through vertical slots 53 in pressure plate 45. Bar 51 is mounted for vertical reciprocation on shaft 54, the latter being supported in lugs 55 which project horizontally from angle plate 42. The inner end of bar 51 is spread and bifurcated to form yoke 56 which engages opposite sides of cam 57 on bodily stationary drive shaft 58. This shaft extends to the rear of the camera, being journaled in housing 11 in any suitable manner. Also on shaft 58 is a drum cam 59. Pin 60, which pivotally connects link or crank arm 48 and pressure plate 45, extends through arcuate slot 61 in angle plate 42 and carries a roller 62 which rides in cam groove 63 of drum 59. Shaft 58 is revolved to cause cam actuation of shuttle bar 51 and pressure plate 45 by the following drive connection. Main shaft 64, actuated by usual hand crank 65 or an electric motor (not shown), has bevel gear connection 66 with shaft 67, the last named shaft being suitably journaled in housing 11 and carrying gear 68 at its forward end. Gear 68 meshes with pinion 69 on shaft 58 which also carries usual shutter 70. Film sprocket 71 is directly driven by shaft 64, and film F passes from one magazine reel (not shown) on the camera box, into chamber 13, over sprocket 71, forms loop L, and then passes back over sprocket 71 and to the other magazine reel (not shown). The forwardly facing stretch of loop L is threaded between plates 44 and 45, the emulsion side of the film being immediately behind the aperture in stripper plate 44 and hence in position to be exposed to light entering through lens mount 35 and passing through apertures 31ª, 27 and the stripper plate aperture, when shutter 70 is open.

The intermittent movement is so timed that when the shutter is thus in position to expose the film, shuttle bar 51 is nearing or at the upper limit of its stroke, and cam 59 is holding plates 44 and 45 at the limit of their movement to the left, as viewed in Fig. 1. When in this position, pilot pins 50 engage the film perforations to hold said film positively against movement, the film at this time being entirely out of engagement with shuttle or catch pins 52. After the exposure is made and the shutter 70 has closed aperture 27, cam 59 moves plates 44, 45 to the right, as viewed in Fig. 1, freeing the film from pilot pins 50, and bringing the film perforations into engagement with catch pins 52. Cam 57 then moves shuttle bar 51 downwardly, catch pins 52 carrying the film to the extent of one picture frame. Thereupon cam 59 moves plates 44, 45 back to their original position, re-engaging the film with pilot pins 50 and freeing the film from catch pins 52. During the subsequent exposure of the film, bar 51 returns to its uppermost position without interfering with the film.

It will be seen that when member 16 is revolved by handle 23, movement M and loop L are swung out of alinement with turret plate aperture 31ª without necessitating that the film be unthreaded from the intermittent movement, and that none of the drive connective elements between said movement and shaft 67 need be disconnected. As plate 16 is rotated in one direction, there will be slight movement of the mechanism, within itself, but the elements of said mechanism return to original position when plate 16 is rotated back to its starting position.

Plate 16 carries a focusing element (in this case ground glass 73) in register with focusing aperture 28. Now in certain types of cameras, the image formed on the ground glass may be viewed from a point directly behind said glass (I have shown such a camera in Figs. 9 to 16) it only being necessary to provide an eye piece in the rear wall of the camera housing. However, in the type of camera illustrated in Figs. 1 to 8, inclusive, sprocket 71 and film F prevent such direct viewing of the image, and I have therefore provided a reflector or prism system whereby light entering the ground glass is projected around sprocket 71 and brought back to an eye piece at the side of housing 11.

A total reflection prism 74 is mounted directly behind glass 73, both prism and glass being secured to member 16 by casing 75 or other suitable means; and either the prism or glass may be considered as a light transmitting element of a focusing device, as will hereinafter be made apparent. Casing 75 preferably includes a short tube 76 extending at right angles to the optical axis of the lens system in mount 35. When plate 16 is revolved to bring glass 73 into register with aperture 31$^a$ (Fig. 7) tube 76 registers with tube 77 which extends through aperture 78 in door 14. A total reflection prism 79 is held in register with tube 78 by angle plate 80 which is secured to door 14 at 14$^a$ and at 81$^a$ to the end of tube 81, the latter being fastened to door 14 at 14$^b$ and extending, with its axis at right angles to the common axis of tubes 77, 76 to the rear of the camera, where it is provided with adjustable eye piece 82.

A focusing microscope mount 83 is shown in tube 81 near the forward end thereof, and while it lies within the scope of my invention to provide any suitable means for preventing the entrance of light to chamber 13 through tube 77 when said tube is out of register with tube 76, I prefer to mount such preventive means, in the form of flap shutter 84, between mount 83 and prism 79.

Shutter 84 is mounted on rock shaft 85 which is journaled in tube 81. The outer end of said shaft extends to the exterior of said tube, and carries an indicator hand 86 to keep the operator advised as to whether the shutter is closed or open. The inner end of shaft 85 projects into chamber 13 and carries a crank arm 87. Torsional spring 88 on shaft 85 normally maintains shutter 84 closed, that is, in the vertical position of Fig. 8, where it closes the aperture of lens mount 83 and prevents light entering eye piece 82 from reaching prism 79 by which it would otherwise be reflected into chamber 13 and fog the film.

On tube 76 is a trip arm 89, and when member 16 is rotated to bring glass 73 into register with turret plate aperture 31$^a$, this trip strikes crank arm 87 and rotates shaft 85 against the action of spring 88, shaft 85 swinging shutter 84 to the left, as viewed in Fig. 8, or into the horizontal position shown in Fig. 7. Shutter 84 is then out of the line of the operator's vision when he sights through eye piece 82, and the image formed on glass 73 is reflected by prisms 74, 79, so as to be plainly visible to the operator. It will be observed that the operator sees the image exactly as it will be presented through the film after plate 16 is moved back to exposure position, and that the picture frame boundaries viewed by the operator will be exactly those of the photographic image.

Since shutter 84 starts to open before member 16 has completed its movement to focusing position, and hence before tube 76 is in full register with tube 77, it is necessary that provision be made to prevent the entrance of light to chamber 13 during the opening of said shutter. For this purpose, I have provided a blade or shield 90 on tube 76, said shield being positioned in advance of the tube aperture when member 16 is rotated left handedly, and is adapted to blank the aperture of tube 77 just before and during the opening movement of shutter 84. To effect a substantially light tight joint between the meeting extremities of tubes 76 and 77, I may provide said extremities with flanges 91 which are adapted to have a comparatively large area of contact.

Figure 6:
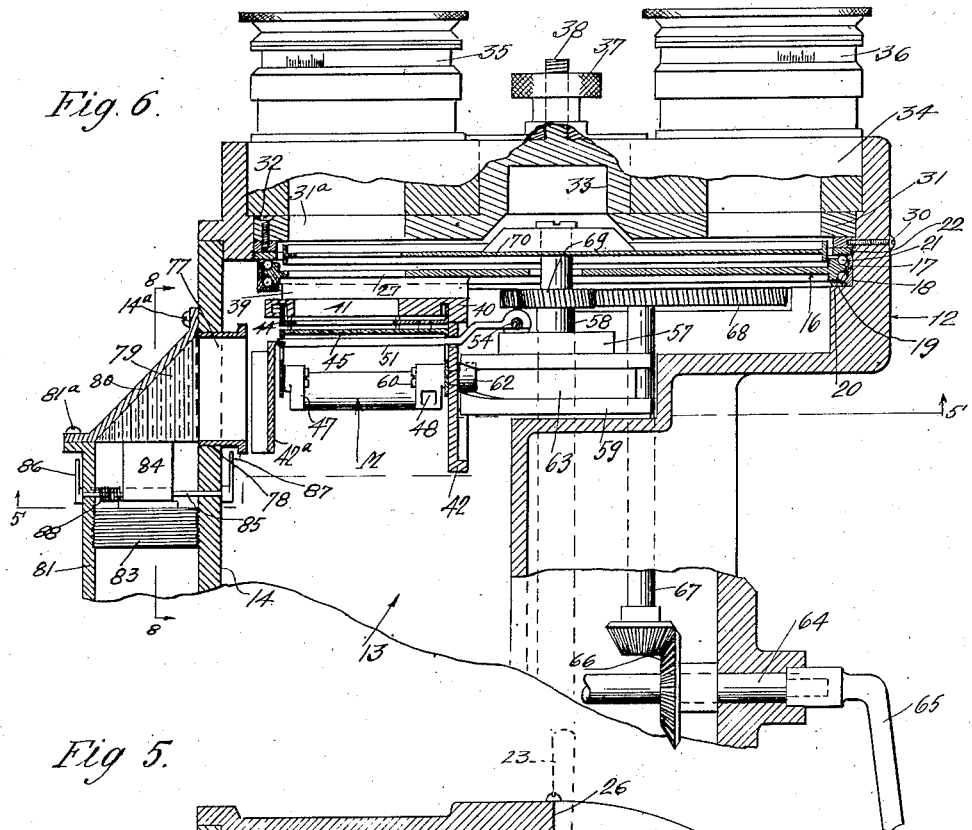
Fig. 6 is a section taken about on line 6—6 of Fig. 5.
Figure 5:
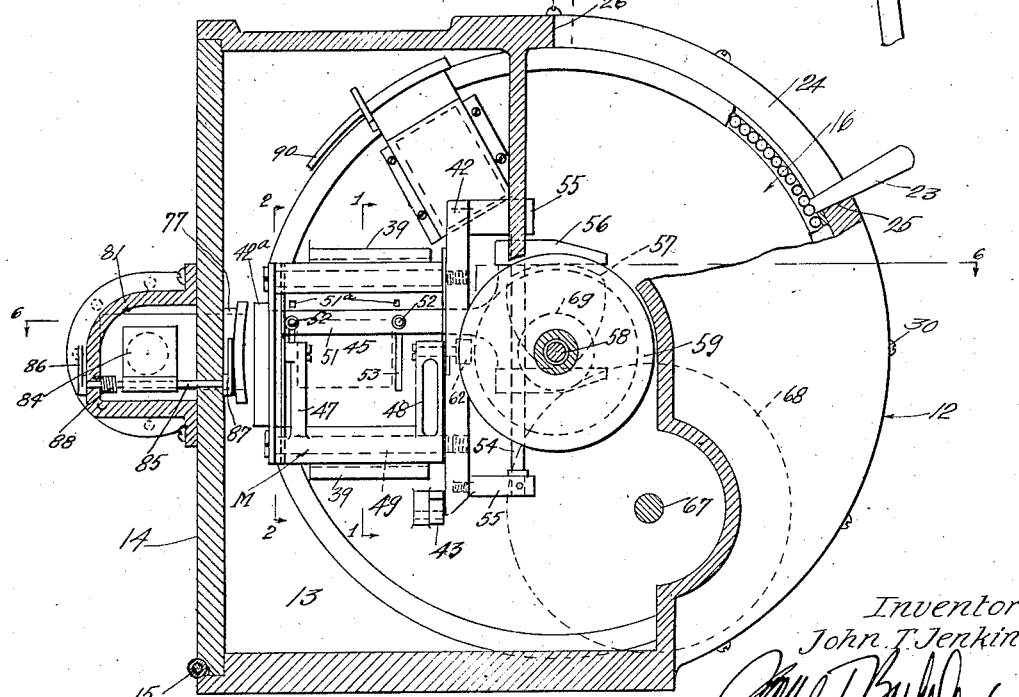
Fig. 5 is a section, certain parts being broken away to expose underlying elements, taken generally on the line 5—5 of Fig. 1 and more particularly on the line 5'—5' of Fig. 6.

After focusing is completed, handle 23 is swung to rotate plate 16 back to the position of Figures 5 and 6, the intermittent movement being thus returned to operative position, and the operator may immediately thereafter start cranking the camera. During the return rotation of member 16, trip 89 leaves arm 87, and spring 88 rotates shutter 84 back to closed position, shield 90 blanking the aperture of tube 77 until said shutter is completely closed.

Since tube 81 and pin 79 are mounted on swinging door 14, it may be stated that the focusing elements carried by the camera box, as well as those carried by revoluble member 16, are movable into and out of operative position.

I will now describe the modification illustrated in Figs. 9 to 16. In the camera there shown, the prism system is omitted, since the construction is such that the focusing eye piece may be disposed directly in alinement with the turret plate aperture. Another distinctive feature is the provision of means whereby the rotatable carrier plate is automatically moved from exposure to focusing position, (and vice versa) by rotation of the crank-shaft. The arrangement is such that after focusing is completed, the carrier plate is automatically moved back to exposure position during the first part of hand crank movement, so there is no liability of the operator continuing to crank the camera with the intermittent mechanism out of operative position.

Certain parts of the mechanism may be substantially the same as those of the camera illustrated in Figs. 1 to 8 inclusive, and therefore I will refer to them without specific description. Camera frame 100 is made up of cylindrical portion 101 and rectangular portion 102, the latter having a hinged door 103. A carrier member or plate 104 is rotatably mounted in housing 101, in substantially the same manner as plate 16, and has exposure aperture 105 (Fig. 15) and focusing aperture 106, these apertures being adapted to be selectively brought into registration with photographic aperture 107 in turret plate 108 and aperture 109 of lens mount 110, the latter being carried by turret 111.

Bodily stationary drive shaft 112 is journaled in bearing 113 at the center of member 104 and at 114 in the plate supported bracket 115. Shutter 116, located between turret plate 108 and carrier member 104, is mounted on the extremity of shaft 112, said shaft also carrying cams 117 and 118 (substantially similar to cams 57 and 59, respectively) and pinion 119. The rest of the intermittent movement (stripper plate, pressure plate, shuttle, etc.) generally indicated at M', is secured in any suitable manner to carrier 104, said movement being in proper association with exposure aperture 105 and being adapted to be actuated by the rotation of shaft 112 in the manner described in connection with movement M and shaft 58.

Rotatable on bracket supported studs 120 are planetary gears 121 which are in constant mesh with gear 119 and internal gear 122 on feed and take-up sprocket 123, the latter being journaled on shaft 112. Removable plate 124 ties together the free extremities of studs 120, being held in place by retention nuts 125. The ends of the studs have axial bores 126, for a purpose to be specified later.

Sprocket 123 has a shaft extension 127 which may be of polygonal cross section to receive hand crank 128, said crank having a hub 129 extending through door aperture 130 into film chamber 131. Sprocket 123 and door 103 may have overlapping ring flanges 132 to provide a substantially light tight joint when the door is closed.

Film F' is brought from one reel R in magazine P through housing aperture 133, over one side of sprocket 123, twisted at 134 so the forward stretch 135 of loop L' may be properly threaded through movement M' and brought back over the opposite side of sprocket 123, whence it passes through aperture 133 to the other magazine reel R. The magazine reels may be driven from pulley 136 on sprocket 123 by spring belt 137.

It will be seen that when handle 128 is rotated, sprocket 123 feeds and takes up the film, and, through the medium of planetary gearing 122, 121, 119, shaft 112 is rotated to actuate movement M'. The gear ratio is such that the number of cycular operations of the intermittent movement per unit time and the angular velocity of sprocket 123 are in proper ratio.

Extending through bores 138 in sprocket 123 are longitudinally slidable rods or pins 139, these pins being normally yieldably held in the position shown in Fig. 10 by springs 140. Pins 139 extend beyond the outer face of sprocket 123 and engage plate 141 which is slidable longitudinally along shaft extension 127 of sprocket 123 and is engaged by the end of crank hub 129. Hub 129 has a lug or projection 142 which is adapted to be in alinement with key-hole slot 143 in door 103 when pins 139 are in axial alinement with stud bores 126.

When it is desired to rotate member 104 to move mechanism M' out of register and focusing aperture 106 into register with aperture 107, crank 128 is rotated until projection 142 is in alinement with slot 143, and then moved longitudinally along shaft 127 until projection 142 is behind door 103. The crank, during its longitudinal movement thrusts plate 141 and hence pins 139 to the left, as viewed in Fig. 10, against the action of springs 140, said pins entering stud bores 126 and serving to interlock the sprocket and member 104 so, upon subsequent counterclockwise rotation of crank 128, as viewed in Fig. 9, member 104 will also be rotated to the left, bringing focusing aperture 106 into register with lens mount 110. I may employ any suitable means for limiting the extent of angular movement of member 104, for instance, stops 145 and 145$^a$ on door 103 may be in such a position as to be engaged by projection 142 when member 104 is at its limit of movement in opposite directions.

After focusing is completed, crank 128 is rotated in a clockwise direction until projection 142 is again in alinement with slot 143, at which time member 104 will have been returned to starting position, and then springs 140 act to disengage pins 139 from studs 120 and to move crank 128 longitudinally along shaft extension 127 to its original position, whereupon subsequent clockwise rotation of said crank advances the film and actuates the intermittent mechanism as before.

Thus it will be seen that member 104 is automatically shifted from focusing position to exposure position when crank 128 is initially rotated after the focusing operation is completed, and that since pins 139 cannot be disengaged from studs 120 until said member has been returned to exposure position, there is no danger of the film advancing mechanism being actuated prior to the return of movement M' to operative position.

Member 104 carries a ground glass 146, which may be considered as a light transmitting element of the focusing device, and tube 147 in alinement with focusing aperture 106, while an eye piece 148 in door 103 is arranged in alinement with turret plate aperture 107.

When member 104 is moved to focusing position, tube 147 is in alinement with eye piece 148 so the operator may directly view the image on ground glass 146. I provide shutter means for preventing light from entering film chamber 131 when tubes 147 and 148 are out of register. Shutter leaves 150 are hinged at 151 within housing 152, being normally held closed by spring 153. Linkage 154 connects leaves 150 to rod 155, said rod being mounted for vertical reciprocation over door 103 and having a foot piece 156.

Tube 147 carries a shield 157 adapted to blank eye piece 148 when the shutter leaves are opening or closing, and this shield has a trip arm 158 adapted to engage foot piece 156 when member 104 is moved to focusing position so, during the last part of said member's movement towards focusing position, rod 155 is lifted to open shutter leaves 150. Spring 153 acts to close the leaves when member 104 is subsequently moved back to exposure position.

As it is sometimes desirable that the operator be able to focus directly through the film (in which case, member 104 is retained in exposure position) I prefer to open up pressure plate 159 of movement M' (Fig. 14) at 160 and to provide a tube 161 on member 104, said tube being in alinement with aperture 160 and eyepiece 148 when member 104 is in exposure position. Then when it is desired to focus through the film, plunger 162 is depressed, the depression of the plunger causing pivotal movement of the door supported lever 163 which, in turn, lifts rod 155 and opens leaves 150. Upon relieving the pressure from plunger 162, spring 153 automatically closes the shutter leaves.

Having described a preferred form of my invention, I claim:

1. In a camera, a single movable carrier member within the camera and having both a focusing aperture and an exposure aperture, film moving mechanism on and movable with the member and associated with said exposure aperture, and means for moving the member to bring said focusing and exposure apertures selectively into registration with the photographic aperture of the camera, said mechanism being adapted to engage the film to move the film with said mechanism in its movement with the carrier member.

2. In a camera, a single movable carrier member within the camera, both a light transmitting element of a focusing device and a film advancing mechanism on and movable with the carrier member, the element and mechanism being spaced apart, and means for moving the member to bring said element and mechanism selectively into operative association with the photographic aperture of the camera, said mechanism being adapted to engage the film to move the film with said mechanism throughout its movement with the carrier member.

3. In a camera, a single movable carrier member within the camera, both a light transmitting element of a focusing device and a film advancing mechanism on and movable with the carrier member, the element and mechanism being spaced apart, means for moving the member to bring said element and mechanism selectively into operative association with the photographic aperture of the camera, said mechanism being adapted to engage the film to move the film with said mechanism throughout its movement with the carrier member, a bodily stationary drive shaft in the camera for said mechanism, and means drivingly connecting the drive shaft with the mechanism throughout movement of said mechanism with the carrier.

4. In a camera, a single movable carrier member within the camera and having both a focusing aperture and an exposure aperture, film advancing mechanism on and movable with the member and associated with said exposure aperture, means for moving the member to bring said focusing and exposure apertures selectively into registration with the photographic aperture of the camera, said mechanism being adapted to engage the film to move the film with said mechanism in its movement with the carrier member, a bodily stationary drive shaft in the camera for said mechanism, and means drivingly connecting the drive shaft with the mechanism throughout movement of said mechanism with the plate.

5. In a camera, a circular, rotatable plate having peripheral bearing within the camera frame and having an exposure aperture, film advancing mechanism on and rotatable with the plate and being operatively associated with the aperture, and means for rotating the plate to move the exposure aperture and its associated mechanism into and out of registration with the photographic aperture of the camera, said mechanism being adapted to engage the film to move the film with said mechanism in its movement with the plate.

6. In a camera, a circular rotatable plate having peripheral bearing within a cylindrical bore provided in the camera frame, one side face of the plate being adapted to engage a shoulder in said bore to limit movement of the plate in one direction along its axis of rotation, adjustable means on the frame adpted to engage the other side face of the plate to adjustably limit movement of said plate in the other direction along its axis of rotation; film advancing mechanism on and movable with said plate, and means for rotating the plate to carry said mechanism into and out of operative association with the photographic aperture of the camera, said mechanism being adapted to engage the film to move the film with said mechanism.

7. In a camera, a circular rotatable plate having peripheral bearing within a cylindrical bore provided in the camera frame, one side face of the plate being adapted to engage a shoulder in said bore to limit movement of the plate in one direction along its axis of rotation, adjustable means on the frame adapted to engage the other side face of the plate to adjustably limit movement of said plate in the other direction along its axis of rotation, releasable means adapted to hold said adjustable means in adjusted position, a turret plate connected to said adjustable means, a lens turret rotatably mounted on said turret plate and with its axis of rotation coincident with that of the first mentioned plate; film advancing mechanism on and movable with said plate, and means for rotating the plate to carry said mechanism into and out of operative association with the photographic aperture of the camera, said mechanism being adapted to engage the film to move the film with said mechanism.

8. In a camera, a carrier member mounted for rotation within the camera frame, a lens turret mounted for rotation within the camera frame whereby it is rotatable to bring its lenses selectively into operative position, the axis of rotation of the member and turret being substantially coincident; a focusing element on and movable with the member, and means for rotating the member to carry the element into and out of operative association with the particular turret lens which is in operative position.

9. In a camera, a carrier member mounted for rotation within the camera frame, a lens turret mounted for rotation within the camera frame whereby it is rotatable to bring its lenses selectively into operative position, the axis of rotation of the member and turret being substantially coincident; film advancing mechanism on and movable with the member, and means for rotating the member to move the film into and out of operative association with the particular turret lens which is in operative position, said mechanism being adapted to engage the film to move the film with said mechanism in its movement with the member.

10. In a camera, a movable carrier member within the camera and having an exposure aperture and a focusing aperture, intermittent mechanism on the carrier member and associated with the exposure aperture, an operating shaft, means drivingly connecting the shaft and intermittent mechanism, means for moving the carrier member to bring said focusing and exposure apertures selectively into registration with the photographic aperture of the camera, said connective means connecting said drive shaft and said mechanism throughout movement of the carrier member.

11. In a camera, a rotatable carrier member within the camera and having an exposure aperture and a focusing aperture, intermittent mechanism on the carrier member and associated with the exposure aperture, a drive shaft in the camera and axially alined with the carrier member, and drive connective means between the shaft and intermittent mechanism, means for rotating the carrier member to bring said focusing and exposure aperture selectively into registration with the photographic aperture of the camera, and to carry said mechanism about the shaft, said connective means connecting said drive shaft and mechanism throughout movement of said mechanism about the shaft.

12. In a camera, a rotatable carrier member within the camera and having an exposure aperture, intermittent mechanism on the member and associated with the exposure aperture, a drive shaft in the camera and axially alined with the carrier member, and drive connective means between the shaft and intermittent mechanism, means for rotating the carrier member to carry the exposure aperture and mechanism about the shaft and thereby bring said exposure aperture and its associated mechanism into and out of registration with the photographic aperture of the camera, said connective means connecting said drive shaft and mechanism throughout movement of said mechanism about the shaft.

13. In a drive shaft operated camera, a movable carrier member within the camera, film advancing mechanism on the member and movable thereby into and out of operative association with the photographic aperture of the camera, an operative connection between the drive shaft and said mechanism, and dis-connectible means drivingly connecting the shaft and member whereby the member is adapted to be moved by virtue of drive shaft rotation.

14. In a drive shaft operated camera, a rotatable carrier member within the camera, film advancing mechanism on the member and movable thereby into and out of operative association with the photographic aperture of the camera, an operative connection between the drive shaft and said mechanism, and dis-connectible means drivingly connecting the shaft and member whereby the member is adapted to be rotated by virtue of drive shaft rotation.

15. In a motion picture camera, film advancing mechanism, a drive shaft, an operative connection between the drive shaft and said mechanism, a movable carrier member on the camera, a light transmitting element of a focusing device on the member and movable thereby into and out of operative association with the photographic aperture of the camera, and a disconnectible driving connection between the shaft and member whereby, when in connection, the member is adapted to be moved by virtue of drive shaft rotation.

16. In a camera, film advancing mechanism within the camera, a drive shaft for operating said mechanism, a movable carrier member within the camera and having a focusing aperture and an exposure aperture adapted to be brought selectively into registration with the photographic aperture of the camera by movement of said member, clutch means for drivingly connecting said shaft and said carrier member, to move the member by virtue of shaft rotation and thereby bring said focusing and exposure apertures selectively into registration with said photographic aperture.

17. In a camera, a rotatable member carrying film advancing mechanism, and adapted by virtue of its rotation to carry said mechanism into and out of operative position, an operating shaft for the mechanism, said shaft being concentric with the axis of rotation of the member, and disengageable means for drivingly connecting the shaft and the rotatable member whereby shaft rotation is adapted to rotate the member and thereby move the film advancing mechanism about the axis of rotation of the shaft into and out of operative position.

18. In a camera, a movable member having an exposure aperture and a focusing aperture, film advancing mechanism on the member and associated with the exposure aperture, operating means for the film advancing mechanism, said member being movable to bring the focusing and exposure apertures selectively into registration with the photographic aperture of the camera, and means to prevent operation of the film moving mechanism when the exposure aperture is out of registration with the photographic aperture.

19. In a camera, a rotatable member having an exposure aperture and a focusing aperture, film advancing mechanism on the member and associated with the exposure aperture, operating means for the film advancing mechanism, said member being rotatable to bring the focusing and exposure apertures selectively into registration with the photographic aperture of the camera, and means to prevent operation of the film moving mechanism when the exposure aperture is out of registration with the photographic aperture.

20. In a camera, a movable member having an exposure aperture, film advancing mechanism on the member and associated with the exposure aperture, operating means for the film advancing mechanism, said member being movable to bring the exposure aperture into and out of registration with the photographic aperture of the camera, and means to prevent operation of the film advancing mechanism when the exposure aperture is out of registration with the photographic aperture.

21. In a crank shaft operated camera, a movable carrier member within the camera and having an exposure aperture, film advancing mechanism on the member in association with the exposure aperture, and means for operatively connecting the carrier and crank shaft whereby crank shaft rotation is adapted to move the exposure aperture and its associated mechanism to and from operative association with the photographic aperture of the camera, said means being also adapted to prevent actuation of the film advancing mechanism when the exposure aperture is moved from operative association with said photographic aperture.

22. In a camera, a movable carrier member within the camera, a focusing element on the member adapted to be carried into and out of registration with the photographic aperture of the camera by movement of said member, a second focusing element stationarily mounted on the camera and so located that it is in operative association with the first focusing element when said first element is in registration with said photographic aperture, and means for moving the carrier member.

23. In a camera, a rotatable carrier member within the camera, a focusing element on the member adapted to be carried into and out of registration with the photographic aperture of the camera by movement of said member, a second focusing element on the camera and so located that it is in operative association with the first focusing element when said first element is in registration with said photographic aperture, and means for rotating the carrier member.

24. In a camera, a movable carrier member within the camera, a focusing element on the member adapted to be carried into and out of registration with the photographic aperture of the camera by movement of said member, a second focusing element stationarily mounted on the camera and so located that it is in operative association with the first focusing element when said first element is in registration with said photographic aperture, means for moving the carrier member, said camera having a viewing aperture associated with the second focusing element whereby the photographic aperture may be viewed when the first and second focusing elements are in registration, and shutter means for blanking said viewing aperture when the focusing elements are out of registration.

25. In a camera, a movable carrier member within the camera, a focusing element on the member adapted to be carried into and out of registration with the photographic aperture of the camera by movement of said member, a second focusing element stationarily mounted on the camera and so located that it is in operative association with the first focusing element when said first element is in registration with said photographic aperture, means for moving the carrier member, said camera having a viewing aperture associated with the second focusing element whereby the photographic aperture may be viewed when the first and second focusing elements are in registration, a shutter between the viewing aperture and the first focusing element, yieldable means for holding the shutter closed when the focusing elements are out of registration, and means for opening the shutter when said focusing elements are is registration.

26. In a camera, a movable carrier member within the camera, a focusing element on the member adapted to be carried into and out of registration with the photographic aperture of the camera by movement of said member, a second focusing element on the camera and so located that it is in operative association with the first focusing element when said first element is in registration with said photographic aperture, means for moving the carrier member, said camera having a viewing aperture associated with the second focusing element whereby the photographic aperture may be viewed when the first and second focusing elements are in registration, a shutter between the viewing aperture and the first focusing element, yieldable means for holding the shutter closed when the focusing elements are out of registration, and means for opening the shutter when said focusing elements are in registration, said last named means being adapted to be operated by the carrier member during its movement.

27. In a camera, a movable carrier member within the camera, a focusing element on the member adapted to be carried into and out of registration with the photographic aperture of the camera by movement of said member, a second focusing element on the camera and so located that it is in operative association with the first focusing element when said first element is in registration with said photographic aperture, means for moving the carrier member, said camera having a viewing aperture associated with the second focusing element whereby the photographic aperture may be viewed when the first and second focusing elements are in registration, a shutter between the viewing aperture and the first focusing element, yieldable means for holding the shutter closed when the focusing elements are out of registration, means for opening the shutter when said focusing elements are in registration; and means for blanking said viewing aperture when said shutter is opening and closing.

28. In a camera, a movable carrier member within the camera, a focusing element on the member adapted to be carried into and out of registration with the photographic aperture of the camera by movement of said member, a second focusing element on the camera and so located that it is in operative association with the first focusing element when said first element is in registration with said photographic aperture, means for moving the carrier member, said camera having a viewing aperture associated with the second focusing element whereby the photographic aperture may be viewed when the first and second focusing elements are in registration, a shutter between the viewing aperture and the first focusing element, yieldable means for holding the shutter closed when the focusing elements are out of registration, means for opening the shutter when said focusing elements are in registration; and means on the carrier member for blanking said viewing aperture when said shutter is opening and closing.

29. In a camera, a rotatable member, said member having an exposure aperture, an intermittent movement on the member and associated with the exposure aperture, a shaft concentric with the axis of rotation of the rotatable member and journaled on said member, drive connective means between the shaft and the intermittent movement, a rotatable feed and take-up sprocket on the member, drive connective means between the sprocket and shaft, means for driving the sprocket, and means for rotating the rotatable member to bring the exposure aperture into and out of registration with the photographic aperture of the camera.

30. In a camera, a rotatable member, said member having an exposure aperture, an intermittent movement on the member and associated with the exposure aperture, a shaft concentric with the axis of rotation of the rotatable member and journaled on said member, drive connective means between the shaft and the intermittent movement, a rotatable feed and take-up sprocket on the member, drive connective means between the sprocket and shaft, means for driving the sprocket, and disengageable means whereby the sprocket and rotatable member are adapted to be rotatably connected so the member is rotated by rotation of the shaft to bring the exposure aperture into and out of registration with the photographic aperture of the camera.

31. In a camera, a rotatable member, said member having an exposure aperture, an intermittent movement on the member and associated with the exposure aperture, a shaft concentric with the axis of rotation of the rotatable member and journaled on said member, drive connective means between the shaft and the intermittent movement, a rotatable feed and take-up sprocket journaled on the shaft, drive connective means between the sprocket and shaft, means for driving the sprocket, and means for rotating the rotatable member to bring the exposure aperture into and out of registration with the photographic aperture of the camera.

32. In a camera, a rotatable member, said member having an exposure aperture, an intermittent movement on the member and associated with the exposure aperture, a shaft concentric with the axis of rotation of the rotatable member and journaled on said member, drive connective means between the shaft and the intermittent movement, a rotatable feed and take-up sprocket journaled on the shaft, planetary gearing between the sprocket and shaft, means for driving the sprocket, and means for rotating the rotatable member to bring the exposure aperture into and out of registration with the photographic aperture of the camera.

33. In a camera, a rotatable member having an exposure aperture and a focusing aperture, an intermittent movement on the member and associated with the exposure aperture, a shaft concentric with the axis of rotation of the rotatable member and journaled on said member, drive connective means between the shaft and the intermittent movement, a rotatable feed and take-up sprocket on the member, drive connective means between the sprocket and shaft, means for driving the sprocket, and means for rotating the rotatable member to bring the exposure aperture and focusing aperture selectively into registration with the photographic aperture of the camera.

34. In a camera, a single movable carrier member within the camera, both a focusing element and a film advancing mechanism on and movable with the carrier member, the element and mechanism being spaced apart, means for moving the member to bring said element and mechanism selectively into operative association with the photographic aperture of the camera, said mechanism being adapted to engage the film to move the film with said mechanism throughout its movement with the carrier member; a second focusing element stationarily mounted on the camera and so located that it is in operative association with the first mentioned focusing element when said first mentioned element is in operative association with said photographic aperture.

35. In a camera, a single movable carrier member within the camera, both a focusing element and a film advancing mechanism on and movable with the carrier member, the element and mechanism being spaced apart, the member being movable to bring said element and mechansm selectively into operative association with the photographic aperture of the camera, a bodily stationary drive shaft for the mechanism, said mechanism being adapted to engage the film to move the film with said mechanism throughout its movement with the carrier member, and means drivingly connecting the shaft with the movable member, whereby the member is adapted to be moved by virtue of drive shaft rotation; a second focusing element stationarily mounted on the camera and so located that it is in operative association with the first mentioned focusing element when said first mentioned element is in operative association with said photographic aperture.

36. In a camera, a single rotatable carrier member within the camera, both a focusing element and a film advancing mechanism on and movable with the carrier member, the element and mechanism being spaced apart, the member being rotatable to bring said element and mechanism selectively into operative association with the photographic aperture of the camera, a bodily stationary drive shaft for the mechanism, the axes of rotation of the drive shaft and rotatable member being substantially coincident, said mechanism being adapted to engage the film to move the film with said mechanism throughout its movement with the carrier member, and means drivingly connecting the shaft with the rotatable member, whereby the member is adapted to be moved by virtue of drive shaft rotation; a second focusing element stationarily mounted on the camera and so located that it is in operative association with the first mentioned focusing element when said first mentioned element is in operative association with said photographic aperture.

37. In a camera, a single rotatable carrier member within the camera, both a light transmitting element of a focusing device and a film advancing mechanism on and movable with the carrier member, the element and mechanism being spaced apart, a bodily stationary drive shaft drivingly connected with the film advancing mechanism, the axes of rotation of the shaft and carrier member being substantially coincident, said carrier member being rotatable to bring said element and mechanism selectively into operative association with the photographic aperture of the camera, and said mechanism being adapted to engage the film to move the film with said mechanism throughout its movement with the carrier member.

38. In a camera, a single rotatable carrier member within the camera, both a light transmitting element of a focusing device and a film advancing mechanism on and movable with the carrier member, the element and mechanism being spaced apart, a bodily stationary drive shaft drivingly connected with the film advancing mechanism, the axes of rotation of the shaft and carrier member being substantially coincident, said carrier member being rotatable to bring said element and mechanism selectively into operative association with the photographic aperture of the camera, and said mechanism being adapted to engage the film to move the film with said mechanism throughout its movement with the carrier member; and means drivingly connecting the shaft with the rotatable carrier, whereby the carrier is adapted to be rotated by virtue of drive shaft rotation.

In witness that I claim the foregoing I have hereunto subscribed my name this 13th day of Sept. 1924.

JOHN T. JENKINS.